3,492,244
METHOD FOR THE PRODUCTION OF COKE
Shinobu Fujiwara, Nishinomiya, Teruo Sawada, Ibaraki, Hirohiko Ichikawa, Kyoto, and Hiroshi Nishino, Nishinomiya, Japan, assignors to Takeda Chemical Industries, Ltd., Osaka, Japan
No Drawing. Filed Oct. 13, 1966, Ser. No. 586,379
Claims priority, application Japan, Oct. 13, 1965, 40/62,848
Int. Cl. C01b *31/12*
U.S. Cl. 252—425                                                      1 Claim

ABSTRACT OF THE DISCLOSURE

A method for producing coke comprising subjecting a mixture of an inorganic sodium salt and coking coal having a grain size from about 10 microns to about 600 microns to carbonization at about 500° to about 900° C., the amount of sodium salt being in the range of from about 0.2 to about 3% by weight based on the amount of coking coal.

---

This invention relates to a novel method for production of coke, and, more particularly, relates to a method for the production of coke which comprises adding an inorganic sodium salt to coking coal, i.e. coke-forming or coking coal, having a grain size of below 600 microns ($\mu$) and subsequently subjecting the mixture to a low temperature carbonization.

In hitherto known methods, the production of activated carbon from coal has been accompanied by various disadvantages, e.g. weak adsorption capacity of the activated carbon, the necessity for many troublesome processes for its production, etc. As coal is of very low price, the accomplishment of the successful production of activated carbon of high quality from coal is desirable in many industrial fields.

The present invention satisfies this desirability for the production of activated carbon of high quality from coal, by means of a simple procedure involving the use of a specific coke having a remarkably strong latent adsorption structure. Further study has revealed that this specific coke having a strong latent adsorption structure is obtainable by (1) employing coking coal, the grain size of which is below 600$\mu$, as the starting material, (2) adding to said coking coal an inorganic sodium salt, and (3) subjecting the mixture to a low temperature carbonization.

One of the objects of this invention is to provide a method for producing the specific coke having a strong latent adsorption structure and can be converted to activated carbon having a strong adsorption capacity. This object is realized by adding an inorganic sodium salt to coking coal having a grain size of below 600$\mu$ and subsequently subjecting the mixture to a low temperature carbonization.

In the method of this invention, the grain size of the coking coal is one of the most important factors in the realization of the object of this invention. This will be apparent from the following test.

TEST

To the respective coking coals shown in the following Table 1 is added 3% by weight of sodium carbonate. The mixtures are subjected to carbonization at 600° C. for 4 to 5 hours. The thus obtained cokes are activated by the conventional means for the production of activated carbon (steam activation at about 800 to 1000° C.), whereby activated carbon is produced. The adsorption capacity of the thus produced activated carbons are examined by the following method:

(a) Decolorization test using liquid caramel

The test is carried out in accordance with the method described in the Japanese Industrial Standard K–1426. More specifically, to 0.1 gram of dried powder of activated carbon in a flask is added 40 milliliters of liquid caramel. After 15 minutes stirring at room temperature, the mixture is filtered. The filtrate (referred to as A) is poured into the color comparison tube of a Duboscq colorimeter up to 45 cm. of its depth. Liquid B is prepared in the same manner as mentioned above except for an addition of 0.1 gram of activated carbon, and is poured into the color comparison tube of the Duboscq colorimeter up to the point "Y" at which the color of the liquid B is the same as that of A. The decolorization capacity is calculated by the following equation:

Decolorization capacity$=(1-Y/45)\times 100$ (b) Test of adsorption capacity by employing acetone Dry aid which contains 37.5 grams of acetone per cubic meter is passed through activated carbon at a thermostat-control temperature of 25° C. The inflow is continued until the equilibrium state is attained. The adsorption capacity of the activated carbon is expressed by the weight percent of acetone adsorbed. The results of Tests (a) and (b) are shown in Table 1:

TABLE 1

| Example | Average grain size of coal ($\mu$) | Caramel-decolorization capacity (percent) | Acetone adsorption capacity (wt. percent) |
|---|---|---|---|
| 1 | 5,613–1,651 | 88 | 10.0 |
| 2 | 1,650–833 | 92 | 15.5 |
| 3 | 832–589 | 95 | 17.0 |
| 4 | 588–246 | 97 | 21.3 |
| 5 | 245–147 | 97 | 21.4 |
| 6 | 146–74 | 97 | 21.5 |
| 7 | <73 | 97 | 21.5 |

From these results, it is clear that coal of grain size of smaller than 600$\mu$ yields activated carbon having much higher adsorption capacities in comparison with coal of average grain size larger than about 600$\mu$. The lower limit of grain size in coal is about 10$\mu$ since coal of grain size smaller than 10$\mu$ is not practical for industrial purposes.

It is very interesting that when an inorganic sodium salt is not added to the coking coal, the adsorption capacity of the activated carbon does not vary with the difference of the grain size of the coking coal, but remains constant (caramel-decolorization capacity=88%; acetone-adsorption capacity=10%).

In the present invention, coking coal is used, but upon necessity, the coal may comprise a mixture of coking coal with non-coking coal or pitch.

In the method of this invention, an inorganic sodium salt is added to the coking coal and intimately admixed therewith. As the inorganic sodium salt, there may be employed, for example, sodium hydroxide, sodium carbonate, sodium hydrogen-carbonate, sodium sulfate, sodium nitrate, sodium chloride, sodium bromide and the like. The said inorganic sodium salt is employed solely or as a mixture of more than one of them. The amount of the inorganic sodium salt to be added is advantageously within the range of from about 0.2 to about 3% by weight, and optimally from about 0.4 to about 2.0% by weight in terms of sodium atom relative to the coking coal. The inorganic sodium salt is employed in the form of an aqueous solution or in the form of a solid.

The following test shows the adsorption capacity, when the amount of sodium atom is altered in various ways.

TEST METHOD

To the coking coals, the grain size of which are below 600 $\mu$, is added sodium carbonate in the amounts shown in Table 2 respectively. Then the mixtures are subjected to carbonization at 600° C. for 4 to 5 hours. Thus obtained cokes are activated by the conventional means of steam activation. The adsorption capacity of the thus-obtained activated carbons are examined in the same way as mentioned above.

TABLE 2

| Amount of sodium atom employed (percent) | Caramel-decolorization capacity (percent) | Acetone-adsorption capacity (percent by wt.) |
|---|---|---|
| 0 | 88.0 | 10.0 |
| 0.2 | 89.5 | 14.0 |
| 0.4 | 92.5 | 20.0 |
| 0.8 | 95.5 | 23.0 |
| 1.2 | 97.5 | 23.0 |
| 1.6 | 94.5 | 20.0 |
| 2.0 | 92.0 | 18.0 |
| 2.4 | 91.0 | 15.5 |
| 2.8 | 90.5 | 14.0 |
| 3.0 | 90.0 | 13.0 |
| 3.2 | *89.5 | *12.0 |

*When sodium carbonate is employed in amounts more than 3.2% by weight, the coke produced is not in massive form but in powdery form.

The mixture of the said coking coal and inorganic sodium salt is then subjected to low temperature carbonization. In the method of this invention, elevation of the temperature of the carbonization is preferably effected gradually. Advantageously the highest temperature of the carbonization is at about 900° C., and optimally at about 500–700° C. The time required for the carbonization is generally from about 4 to about 20 hours.

Activation of the coke of this invention may be carried out by conventional means such as the so-called "steam activation" at about 800–1000° C. The steam activation may be carried out by the use of steam only, a mixture of steam with air, a mixture of steam and carbon dioxide, fuel gas or the like.

Activated carbon produced from coke obtained according to this invention shows a strong adsorption capacity which is of the same magnitude as or even superior to that of activated carbon produced from charcoal. Further, since the density of the activated carbon produced from the coke of this invention is about 1.5 to 2.0 times as high as that of activated carbon produced from charcoal, the handling of the activated carbon produced from the coke of this invention is simple. Further, the loss of raw material to be purified by the adsorption process using the activated carbon in this invention is small; adsorption equipment is small and the waste content of the activated carbon is small. Moreover, the reaction velocity of the production of activated carbon from the coal of this invention is about 1.5 to 2.0 times as high as that from charcoal.

The following examples are only illustrative and are not meant to restrict the scope of this invention. Throughout the specification, the abbreviations "kg.," "g.," "ml.," "cm.," "m." and "$\mu$" represent "kilograms," "grams," "milliliters," "centimeters," "meters" and "microns" respectively.

Example 1

A box made from iron (0.1 m. x 0.3 m. x 0.4 m.) is heated by means of flue gas until the outer temperature becomes 600° C., and is packed with a mixture of 5.82 kg. of powdery coking coal having a grain size of below 600$\mu$ and 0.18 kg. of powdery sodium carbonate. Then the box is subjected to carbonization until the inner temperature of the box becomes 550° C., for about 4 hours, whereby 4.3 kg. of massive coke is obtained.

Example 2

To 3.88 kg. of coking coal, the grain size being below 600$\mu$, is added an aqueous solution of 0.12 kg. of sodium carbonate, followed by mixing thoroughly. The thus obtained powder is put into a rotary furnace (0.3 m. in diameter; 0.5 m. in length) which is heated to 600° C. Carbonization is continued until the inner temperature becomes 550° C., for about 4 hours, whereby 2.75 kg. of massive coke is obtained.

Example 3

To 5.76 kg. of coking coal having a grain size below 600$\mu$ is added 0.24 kg. of powdery sodium sulfate. The mixture is treated in the same way as in Example 1, whereby 4.2 kg. of massive coke is produced.

Example 4

To 5.85 kg. of coking coal having a grain size below 600$\mu$ is added 0.15 kg. of powdery sodium hydroxide. The mixture is treated in the same way as in Example 1, whereby 4.3 kg. of massive coke is obtained. The coke is subjected to steam activation at 900–1000° C., to obtain activated carbon showing a caramel-decolorization capacity of 96.0%.

Example 5

To 5.7 kg. of coking coal having a grain size below 600$\mu$ is added 0.30 kg. of powdery sodium nitrate. The mixture is treated in the same way as in Example 1, whereby 4.25 kg. of massive coke is produced. The thus produced coke is subjected to steam activation at 900–1000° C., whereby activated carbon showing caramel-deolorization capacity and acetone-adsorption capacity at 95.0% and 23.5% respectively is obtained.

Example 6

To 5.85 kg. of coking coal having a grain size below 600$\mu$ is added 0.20 kg. of powdery sodium chloride. The mixture is treated in the same way as in Example 1, whereby 4.12 kg. of massive coke is produced. Activated carbon produced from the said coke shows a 94.0% caramel-decolorization capacity.

Example 7

5.85 kg. of a mixture of coking coal having a grain size below 600$\mu$ and non-caking coal in the ratio of 8:2 is mixed with 0.15 kg. of powdery sodium hydroxide. The resultant mixture is treated in the same way as in Example 1, whereby 4.24 kg. of coke is produced. Activated carbon is produced from the said coke by means of steam activation at 900° C., and the thus-obtained activated carbon shows a caramel-decolorization capacity and acetone-absorption capacity of 96.0% and 24.0% respectively.

Having thus described this invention, what is claimed is:

1. The activated carbon produced by the steam-activation at about 800° to 1000° C., of an admixture of coal having a grain size between about 10$\mu$ to about 600$\mu$ and an inorganic sodium salt which admixture had been carbonized at a temperature between about 500° C. and about 900° C., the amount of sodium salt being in the range of from about 0.2 to about 3% by weight in terms of sodium based on the amount of coking coal.

References Cited

UNITED STATES PATENTS

| 1,505,496 | 8/1924 | Rohde. |
| 1,547,037 | 7/1925 | Hene. |
| 1,643,032 | 9/1927 | Riddle. |
| 1,643,031 | 9/1927 | Riddle. |
| 1,845,815 | 2/1932 | Riddle. |

OTHER REFERENCES

Kirk—other: Encyclopedia of Chemical Technology, 2nd revised edition, vol. 4, pp. 149–158.

DANIEL E. WYMAN, Primary Examiner

P. M. FRENCH, Assistant Examiner